(12) United States Patent
Schuetz

(10) Patent No.: US 7,644,948 B2
(45) Date of Patent: Jan. 12, 2010

(54) ASSEMBLY WITH A GAS BAG MODULE

(75) Inventor: Dominik Schuetz, Waldaschaff (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 177 days.

(21) Appl. No.: 11/641,499

(22) Filed: Dec. 19, 2006

(65) Prior Publication Data

US 2007/0138772 A1 Jun. 21, 2007

(51) Int. Cl.
*B60R 21/12* (2006.01)

(52) U.S. Cl. .................................. 280/728.2

(58) Field of Classification Search ............. 280/728.2, 280/731; 200/61.54, 61.55
See application file for complete search history.

(56) References Cited

U.S. PATENT DOCUMENTS

| 5,738,369 | A  | * | 4/1998  | Durrani ................. 280/731 |
| 6,682,092 | B2 | * | 1/2004  | Schutz et al. ........... 280/731 |
| 6,688,638 | B2 | * | 2/2004  | Schutz ................. 280/728.2 |
| 6,840,537 | B2 | * | 1/2005  | Xu et al. ............... 280/731 |
| 7,114,745 | B2 |   | 10/2006 | Schutz et al. |
| 2004/0119582 | A1 | * | 6/2004 | Schutz et al. ......... 340/425.5 |

FOREIGN PATENT DOCUMENTS

DE        20219124        5/2003

* cited by examiner

*Primary Examiner*—Paul N Dickson
*Assistant Examiner*—Robert A Coker
(74) *Attorney, Agent, or Firm*—Tarolli, Sundheim, Covell & Tummino LLP

(57) ABSTRACT

In an assembly with a gas bag module at least one first detent element is designed for engagement into a second detent element, a load bearing fastening between the first and the second detent element fastening the gas bag module to a first vehicle-fixed component being closed by moving the gas bag module in an installation direction. An additional locking structure is provided which is separate from the first and second detent elements, and which connects the gas bag module with a second vehicle-fixed component. The additional locking structure exclusively determines in the installed state a final installation position of the gas bag module with respect to the second vehicle-fixed component, at least against the installation direction.

14 Claims, 2 Drawing Sheets

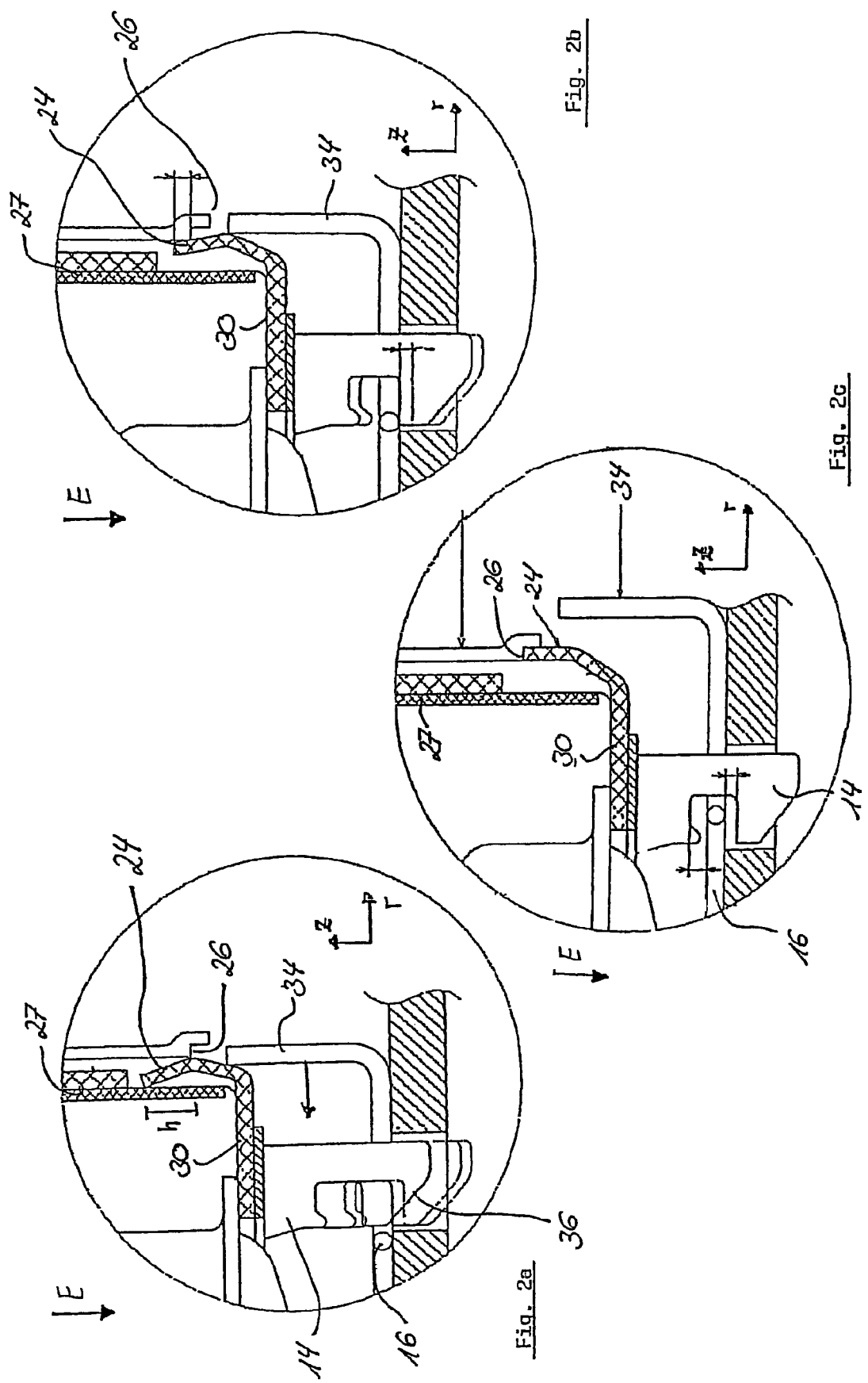

ASSEMBLY WITH A GAS BAG MODULE

FIELD OF THE INVENTION

The invention relates to an assembly with a gas bag module.

BACKGROUND OF THE INVENTION

Gas bag modules often have at least one first detent element which is designed for engagement into a second detent element for load-bearing fastening of the gas bag module to a first vehicle-fixed component.

Such fastenings are frequently used for fixing a gas bag module in the hub of a steering wheel, because the actual installation process can thus be reduced to pushing the gas bag module into a recess of the steering wheel and, in particular, there are no longer any screw connections to be closed.

Another requirement is that the gas bag module is to be fitted as exactly as possible into the surface of a surrounding vehicle interior lining (such as, for example, a steering wheel covering), where cumulative tolerances may cause undesired inaccuracies.

SUMMARY OF THE INVENTION

It is an object of the invention to establish in a simple manner the exact position of the gas bag module with respect to a vehicle interior lining.

This is achieved in an assembly with a gas bag module having at least one first detent element designed for engagement into a second detent element, a load bearing fastening between the first and the second detent element fastening the gas bag module to a first vehicle-fixed component being closed by moving the gas bag module in an installation direction. An additional locking structure is provided which is separate from the first and second detent elements and which connects the gas bag module with a second vehicle-fixed component. The additional locking structure exclusively determines in the installed state a final installation position of the gas bag module with respect to the second vehicle-fixed component, at least against the installation direction.

In contrast to the load-bearing fastening, which already because of its size can only be manufactured with great effort so as to be accurate in respect of position, the additional locking structure, which only has to withstand small forces, can be easily arranged and designed so that it precisely pre-defines the position of the gas bag module, particularly along the installation direction. Furthermore, the additional locking structure can be arranged specifically on the adjoining vehicle-fixed component into which the gas bag module is to be fitted. The final installation position here is the basic position of the gas bag module in the installed state without the action of further forces, e.g. by a vehicle occupant or an unfolding gas bag.

The first and the second components which are fixed to the vehicle may be sections of a single component or else different components, so that the load-bearing fastening and the additional locking structure connect the gas bag module with the same or different vehicle-fixed components. For example, the load-bearing fastening may engage on a steering wheel hub, whilst the additional locking structure fastens the gas bag module to a steering wheel covering and establishes the position of the gas bag module with respect to the steering wheel covering, preferably in all spatial directions.

A position of the gas bag module is preferably determined transversely to the installation direction in the installed state by means of the additional locking structure. The transverse position may also be established exclusively by means of the additional locking structure. In this way, the alignment of the gas bag module with respect to the vehicle interior lining may be achieved, independently of the arrangement of the load-bearing fastening, entirely by means of the additional locking structure.

In order to be able to actuate the horn by pressing down the gas bag module, the additional locking structure advantageously allows a play only in the installation direction. If the gas bag module is not fastened on the steering wheel, but rather at a different location in the vehicle, this play is also preferably eliminated.

The additional locking structure is advantageously arranged in the region of a side wall of the gas bag module, which keeps the expenditure low for providing the locking element.

A first locking element of the additional locking structure may, for example, simply be a deflectable tongue.

The first locking element may be additionally formed at a favourable cost by a section of a module housing of the gas bag module.

If the second locking element is formed by a section of a vehicle interior lining, the cumulative tolerances between the gas bag module and the vehicle-fixed component are very small.

The section of the vehicle interior lining may extend parallel to the side wall of the gas bag module, in order to achieve a correct alignment of the gas bag module with respect to the vehicle-fixed components, and hence small gap dimensions.

The second locking element is preferably formed quite simply by a stop which prevents a movement against the direction of installation.

It is also possible to design the second locking element as a stop which prevents a movement in a direction transversely to the installation direction.

The additional locking structure can be formed such that it may be closed and/or released together with the load-bearing fastening between the first and second detent elements, which facilitates installation and dismounting.

BRIEF DESCRIPTION OF THE DRAWINGS

FIGS. 2a-c show the closing and opening of the fastening and of the additional locking structure in the assembly with the gas bag module according to the invention.

DETAILED DESCRIPTION OF A PREFERRED EMBODIMENT

Figure 1:
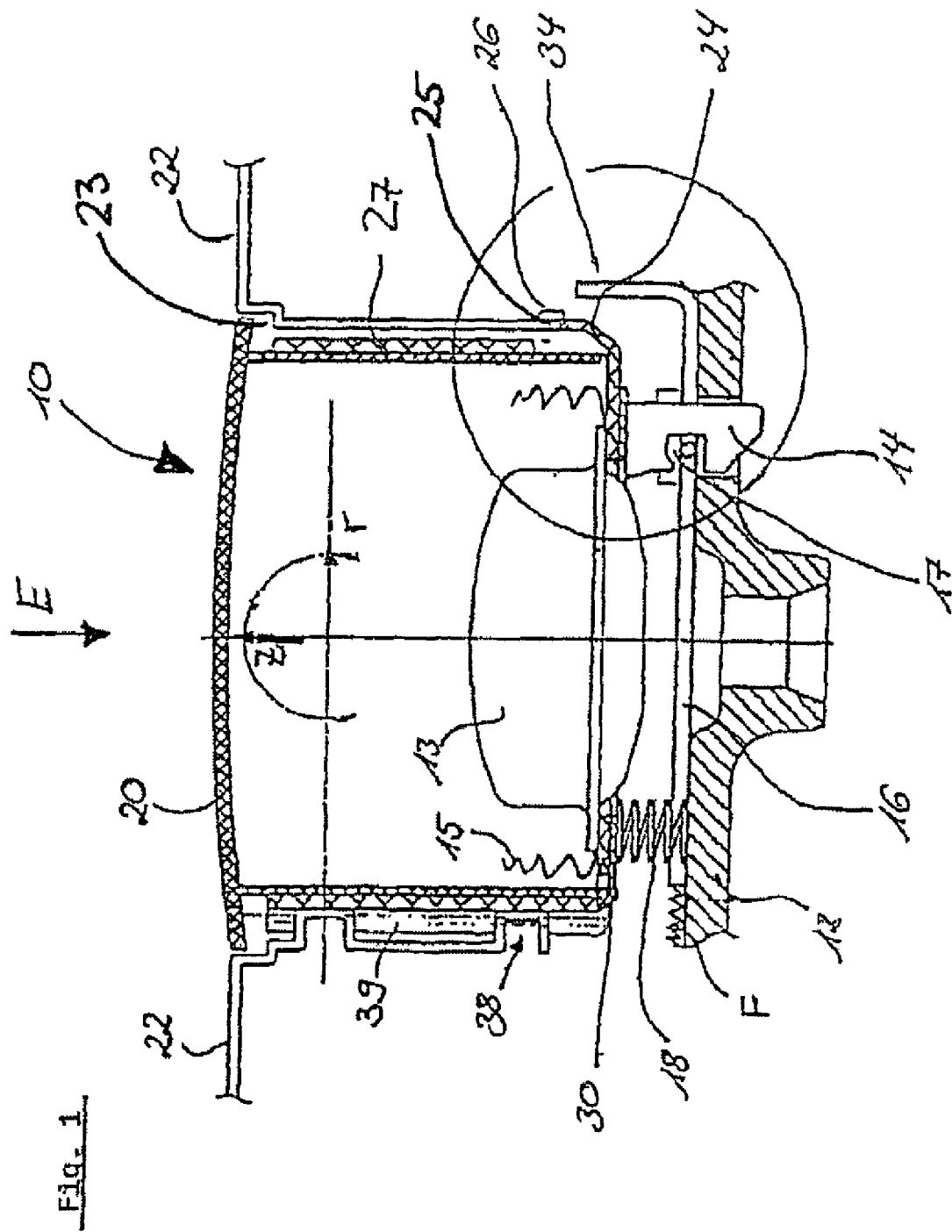
FIG. 1 shows a diagrammatic sectional view of a steering wheel in the region of the hub with an assembly with a gas bag module according to the invention.

In FIG. 1 an assembly with a gas bag module 10 is shown, which is fastened by means of a load-bearing fastening to a vehicle-fixed component 12, here the hub of a steering wheel. The gas bag module 10 has a housing with a covering cap 20, side walls adjoining the covering cap 20, and a base 30 which is formed here by a generator carrier. A gas generator 13 and a gas bag 15 are held in the gas bag module 10 in a known manner.

The gas bag module 10 is inserted into a mounting recess 23 in the steering wheel.

The fastening of the gas bag module 10 consists of a detent connection between one or more first detent elements 14 (here only one detent hook is shown, arranged on the underside of the gas bag module 10), which engage into one or more second detent elements 16, one single locking element being provided here as the second detent element 16, which is acted upon by a spring F transversely to an installation direction E. A continuously encircling, bent wire, a locking plate, a spring wire or suchlike may be provided for example as the locking element. If a rigid locking element is used, it may be constructed so as to be prestressed by a spring elastic element and so as to be displaceable. Of course, the first detent element 14 may, vice versa, be designed as a corresponding locking element and the second detent element 16 may be constructed as a detent hook or detent pin or similar.

In the shown correctly locked state of the load-bearing fastening 14, 16, the first detent element 14 is in engagement with the second detent element 16, the gas bag module 10 being secured in a load-bearing manner against removal from the vehicle-fixed component 12. In actual terms, in the example shown, a section of the second detent element 16 lies in a recess 17 of the first detent element 14. The gas bag module 10 is in its final installation position (shown in FIGS. 1 and 2c), in which it is not subjected to any further forces by a vehicle occupant or by an unfolding gas bag.

Despite the securing, the fastening 14, 16 offers a certain amount of play in the z direction indicated in the figures, and namely both in and against an installation direction E pointing parallel to the z axis into the steering wheel. The play in the z direction is planned in order to be able to press the gas bag module 10 into the steering wheel in accordance with the floating horn principle to close horn contacts (not shown). For this, the gas bag module 10 is moved against a restoring spring 18. In the gas bag module 10 which is shown here, provision is made that the restoring spring 18 provides such a large z stroke that the gas bag module 10 would stand out by a distance h from the vehicle-fixed component 12 when the fastening 14, 16 is not correctly closed, and would protrude with respect to a steering wheel covering.

In the correctly locked state of the fastening 14, 16, on the other hand, the covering cap 20 of the gas bag module 10 terminates flush with an outer side of a vehicle interior lining 22, here the steering wheel covering. The vehicle interior lining 22 is made of plastic and has an edge which is angled from the outer side into the mounting opening for the gas bag module 10, this edge defining the mounting recess 23 of the gas bag module 10.

The exact position of the gas bag module 10 in the z direction is not determined by the fastening 14, 16, but rather by an additional locking structure provided in the assembly that is separate from the first and second detent elements 14, 16, and has first and second locking elements 24, 26, which connect the gas bag module 10 with a second vehicle-fixed component, here the vehicle interior lining 22.

The closing of the locking structure is shown in closer detail in FIGS. 2a to 2c. The first locking element 24 in this case is a tongue, which is able to be deflected elastically, arranged on the base 30 of the gas bag module 10, whilst the second locking element 26 is formed by a shoulder on a section of the vehicle interior lining 22 extending approximately parallel to a side wall 27 of the gas bag module 10. The second locking element 26 forms a stop 25 which prevents a movement of the first locking element 24 both against the installation direction E and also transversely thereto in the lateral direction, i.e. in the outwardly pointing radial direction r. The position of the gas bag module 10 in relation to the second vehicle-fixed component is hereby determined entirely and precisely in all spatial directions.

For the gas bag module 10, a play merely still exists in the installation direction E for actuating the horn when the gas bag module 10 is pressed into the steering wheel. Against the installation direction E and also in the radial direction r towards the exterior, the gas bag module 10 is, by contrast, fixed. Several slits 39 are preferably provided, distributed over the periphery, on the gas bag module 10, and noses 38 on the vehicle interior lining 22, by means of which the gas bag module 10 is guided entirely in the slits 39, along and transversely to the installation direction E and rotationally about E.

The slits 39 may alternate for example with the noses 38 shown on the left-hand side of FIG. 1, formed in the side wall of the vehicle interior lining 22 delimiting the mounting space.

If the gas bag module 10 is installed at a different location in the vehicle (e.g. the instrument panel), the play in the installation direction E may also be dispensed with, so that the gas bag module 10 is fixed in its mounting so as to be free of play in all directions.

An auxiliary element 34, which is realized here as an upwardly bent section of the locking element forming the second detent element 16, ensures that the first locking element 24 can only come into engagement with the second locking element 26 when the second detent element 16 has engaged correctly into the first detent element 14. Instead of a locking wire or locking plate, a spring wire or suchlike may also be provided. Of course, the auxiliary element 34 does not have to be constructed in one piece with the second detent element 16; it may also be a separate component which is uncoupled or coupled therewith. The auxiliary element 34 is moved here together with or by the second detent element 16, which does not, however, automatically have to be the case.

When closing the fastening between the first and second detent elements 14, 16, the second detent element 16 is firstly pressed to the side by a guide ramp 36 at the lower end of the first detent element 14, towards the left in the figures shown here, contrary to the elastic force F. With the sideways movement, the auxiliary element 34 also moves towards the left (arrow in FIG. 2a). The dimensions of the auxiliary element 34 and the first locking element 24 are such that in the not correctly locked state of the fastening 14, 16 which is now present (see FIG. 2b, in which the second detent element 16 is in fact in contact with the first detent element 14, but has not yet engaged fully into the recess 17 of the first detent element 14), the auxiliary element 34 is in abutment with the first locking element 24 such that the latter is held spaced apart from the second locking element 26 of the locking structure. The connection between the first and second locking elements 24, 26 therefore can not be closed. Consequently, however, the movement of the gas bag module 10 in the z direction is not restricted strongly enough, so that the restoring spring 18 will press the gas bag module 10 out over the surface of the vehicle interior lining 22. It can therefore be recognized immediately that the load-bearing fastening between the first and second detent elements 14, 16 is not in the correctly locked state.

When the gas bag module 10 now moves in the installation direction E further against the restoring force of the restoring spring 18, the detent hook passes the second detent element 16, as shown in FIGS. 2b and 2c, and the latter comes into full engagement with the recess 17 in the first detent element 14. The first locking element 24, i.e. here the elastically deflectable tongue, is pre-stressed radially outwards. The auxiliary element 34 likewise moves towards the right according to the movement of the second detent element 16, so that gradually the first locking element 24 moves outwards in the radial direction r (FIG. 2b). A prerequisite is that the detent element 16 can actually move towards the right without jamming or too great a friction by a restoring spring F acting horizontally (see FIG. 1). An over-pressing in the installation direction E into the position shown in FIG. 2c, finally, makes provision that the first locking element 24 arrives into the correct position, in order to engage into the second locking element 26. In this case, therefore, the tongue comes to abut against the shoulder in the lateral section of the vehicle interior lining 22. "Over-pressing" is to be understood to mean that the gas bag module 10 is moved further in the installation direction E than would be necessary for the engagement of the second detent element 16 into the first detent element 14. The correctly locked position of the gas bag module 10, in which the detent elements 14 and 16 are spaced apart from each other, is shown in FIG. 2c. If the friction is too great, or the detent element 16 has jammed, one obtains the not correctly locked state of the fastening shown in FIG. 2b.

A closing of the locking structure is only possible when the first detent element 14 is in correct engagement with the second detent element 16.

The locking structure adjusts the position of the gas bag module 10, and hence the exact position of the gas bag module 10 in the z direction, in a simple manner. The adjustment is independent of the exact z position of the load-bearing fastening 14, 16. The locking structure, particularly together with the guides 38 and the slits 39, allows the gas bag module 10 to be positioned very precisely with respect to the vehicle interior lining 22 in all six degrees of freedom.

The locking structure only has to receive the small forces of daily vehicle operation. However, the illustrated form of the locking structure for example is entirely sufficient for this purpose. As shown in FIG. 2c, no contact is necessary between the second detent element 16 and the first detent element 14 in normal driving operation. In the case which is shown, the section of the second detent element 16 which forms the actual lock lies inside the recess 17 in the first detent element 14 without contact on all sides. In this way, for example, an undesired rattling can be prevented. If the gas bag module 10 is activated in an accident, the gas bag module 10 is drawn upwards so far in the z direction during the unfolding of the gas bag that the load is received practically entirely by the load-bearing fastening 14, 16.

The first and second locking elements 24, 26 could also be placed closer to the upper end of the gas bag module 10.

If the gas bag module 10 is to be separated from the vehicle-fixed component 12, then the second detent element 16 is moved radially inwards (towards the left in the figures) for unlocking. Basically, the sequence shown in FIGS. 2a to 2c is run through in the reverse order. The auxiliary element 34 comes into abutment against the first locking element 24 and presses it out of engagement with the second locking element 26 (from FIG. 2c to FIG. 2b). At the same time, the second detent element 16 moves out of engagement with the first detent element 14 (from FIG. 2b to FIG. 2a). The restoring spring 18 presses the gas bag module 10 so far upwards that it projects over the surface of the vehicle interior lining 22 and can be removed.

Of course, the role of the locking elements 24, 26 could also be exchanged, so that the stop 25 is provided on the gas bag module and a tongue is provided on the lining. Other solutions are also conceivable for the design of the locking structure, which make an exact positioning possible independently of the load-bearing fastening.

The proposed gas bag module could also for example be arranged on a passenger side, in a back rest of a vehicle seat or at another suitable location in a vehicle.

The closing and opening of the locking structure can also be realized in other ways independently of the use of the described auxiliary element 34.

The invention claimed is:

1. An assembly with a gas bag module comprising:
a gas bag module (10) having at least one first detent element (14) designed for engagement into a second detent element (16) for providing a load bearing fastening between the first and the second detent elements (14, 16) thereby connecting the gas bag module (10) to a first component (12) fixed to a vehicle, the gas bag module (10) being attached to the first component (12) by moving the gas bag module in an installation direction (E), and
an additional locking structure (24, 26) which is separate from the first and second detent elements (14, 16), and which connects the gas bag module (10) with a second component fixed to the vehicle,
in an installed state of the module (10) the additional locking structure (24, 26) exclusively determining a final installation position of the gas bag module (10) with respect to the second component, at least opposite to the installation direction (E), a position of the gas bag module (10) transversely to the installation direction (E) being determined by one of the additional locking structure and a guide (38) in the installed state of the gas bag module (10).

2. The assembly according to claim 1, wherein the additional locking structure permits a play of the gas bag module (10) with respect to the first component (12) only in the installation direction (E).

3. The assembly according to claim 1, wherein a first locking element (24) of the additional locking structure is at least one deflectable tongue.

4. The assembly according to claim 1, wherein the second component is a vehicle interior lining (22).

5. The assembly according to claim 4, wherein a mounting recess (23) is formed in the vehicle interior lining (22) into which the gas bag module (10) can be completely inserted in a correctly locked state of the fastening (14, 16), and, in a not correctly locked state of the fastening, the additional locking structure (24, 26) preventing the gas bag module (10) from being completely inserted into the mounting recess (23) so that the gas bag module (10) is out of alignment with respect to the vehicle interior lining (22).

6. An assembly with a gas bag module comprising:
a gas bag module (10) having at least one first detent element (14) designed for engagement into a second detent element (16) for providing a load bearing fastening between the first and the second detent elements (14, 16) thereby connecting the gas bag module (10) to a first component (12) fixed to a vehicle, the gas bag module (10) being attached to the first component (12) by moving the gas bag module in an installation direction (E), and
an additional locking structure (24, 26) which is separate from the first and second detent elements (14, 16), and which connects the gas bag module (10) with a second component fixed to the vehicle,
in an installed state of the module (10) the additional locking structure (24, 26) exclusively determining a final installation position of the gas bag module (10) with respect to the second component, at least opposite to the installation direction (E), wherein a first locking element (24) of the additional locking structure is formed by at least one section of a module housing (30) of the gas bag module (10).

7. An assembly with a gas bag module comprising:
a gas bag module (10) having at least one first detent element (14) designed for engagement into a second detent element (16) for providing a load bearing fastening between the first and the second detent elements (14, 16) thereby connecting the gas bag module (10) to a first component (12) fixed to a vehicle, the gas bag module (10) being attached to the first component (12) by moving the gas bag module in an installation direction (E), and
an additional locking structure (24, 26) which is separate from the first and second detent elements (14, 16), and which connects the gas bag module (10) with a second component fixed to the vehicle,
in an installed state of the module (10) the additional locking structure (24, 26) exclusively determining a final installation position of the gas bag module (10) with respect to the second component, at least opposite to the installation direction (E), wherein the additional locking structure is arranged in the region of a side wall (27) of the gas bag module (10).

8. An assembly with a gas bag module comprising:
a gas bag module (10) having at least one first detent element (14) designed for engagement into a second detent element (16) for providing a load bearing fastening between the first and the second detent elements (14, 16) thereby connecting the gas bag module (10) to a first component (12) fixed to a vehicle, the gas bag module (10) being attached to the first component (12) by moving the gas bag module in an installation direction (E), and an additional locking structure (24, 26) which is separate from the first and second detent elements (14, 16), and which connects the gas bag module (10) with a second component fixed to the vehicle, in an installed state of the module (10) the additional locking structure (24, 26) exclusively determining a final installation position of the gas bag module (10) with respect to the second component, at least opposite to the installation direction (E), wherein a second locking element (26) of the additional locking structure is formed by a section of a vehicle interior lining (22).

9. The assembly according to claim 8, wherein the section of the vehicle interior lining (22) extends parallel to a side wall (27) of the gas bag module (10).

10. An assembly with a gas bag module comprising:
a gas bag module (10) having at least one first detent element (14) designed for engagement into a second detent element (16) for providing a load bearing fastening between the first and the second detent elements (14, 16) thereby connecting the gas bag module (10) to a first component (12) fixed to a vehicle, the gas bag module (10) being attached to the first component (12) by moving the gas bag module in an installation direction (E), and an additional locking structure (24, 26) which is separate from the first and second detent elements (14, 16), and which connects the gas bag module (10) with a second component fixed to the vehicle, in an installed state of the module (10) the additional locking structure (24, 26) exclusively determining a final installation position of the gas bag module (10) with respect to the second component, at least opposite to the installation direction (E), wherein a second locking element (26) of the additional locking structure is formed by a stop which prevents a movement opposite to the installation direction (E).

11. An assembly with a gas bag module comprising:
a gas bag module (10) having at least one first detent element (14) designed for engagement into a second detent element (16) for providing a load bearing fastening between the first and the second detent elements (14, 16) thereby connecting the gas bag module (10) to a first component (12) fixed to a vehicle, the gas bag module (10) being attached to the first component (12) by moving the gas bag module in an installation direction (E), and an additional locking structure (24, 26) which is separate from the first and second detent elements (14, 16), and which connects the gas bag module (10) with a second component fixed to the vehicle, in an installed state of the module (10) the additional locking structure (24, 26) exclusively determining a final installation position of the gas bag module (10) with respect to the second component, at least opposite to the installation direction (E), wherein a second locking element (26) of the additional locking structure is formed by a stop which prevents a movement in a direction transversely to the installation direction (E).

12. An assembly with a gas bag module comprising:
a gas bag module (10) having at least one first detent element (14) designed for engagement into a second detent element (16) for providing a load bearing fastening between the first and the second detent elements (14, 16) thereby connecting the gas bag module (10) to a first component (12) fixed to a vehicle, the gas bag module (10) being attached to the first component (12) by moving the gas bag module in an installation direction (E), and an additional locking structure (24, 26) which is separate from the first and second detent elements (14, 16), and which connects the gas bag module (10) with a second component fixed to the vehicle, in an installed state of the module (10) the additional locking structure (24, 26) exclusively determining a final installation position of the gas bag module (10) with respect to the second component, at least opposite to the installation direction (E), wherein the additional locking structure can be closed together with the load-bearing fastening between the first and second detent elements (14, 16).

13. An assembly with a gas bag module comprising:
a gas bag module (10) having at least one first detent element (14) designed for engagement into a second detent element (16) for providing a load bearing fastening between the first and the second detent elements (14, 16) thereby connecting the gas bag module (10) to a first component (12) fixed to a vehicle, the gas bag module (10) being attached to the first component (12) by moving the gas bag module in an installation direction (E), and an additional locking structure (24, 26) which is separate from the first and second detent elements (14, 16), and which connects the gas bag module (10) with a second component fixed to the vehicle, in an installed state of the module (10) the additional locking structure (24, 26) exclusively determining a final installation position of the gas bag module (10) with respect to the second component, at least opposite to the installation direction (E), wherein the first detent element (14) and the second detent element (16) are spaced apart from each other in the correctly locked state.

14. An assembly with a gas bag module comprising:
a gas bag module (10) having at least one first detent element (14) designed for engagement into a second detent element (16) for providing a load bearing fastening between the first and the second detent elements (14, 16) thereby connecting the gas bag module (10) to a first component (12) fixed to a vehicle, the gas bag module (10) being attached to the first component (12) by moving the gas bag module in an installation direction (E), and an additional locking structure (24, 26) which is separate from the first and second detent elements (14, 16), and which connects the gas bag module (10) with a second component fixed to the vehicle, in an installed state of the module (10) the additional locking structure (24, 26) exclusively determining a final installation position of the gas bag module (10) with respect to the second component, at least opposite to the installation direction (E), wherein the additional locking structure can be released together with the load-bearing fastening between the first and second detent elements (14, 16).

* * * * *

UNITED STATES PATENT AND TRADEMARK OFFICE
CERTIFICATE OF CORRECTION

| | | |
|---|---|---|
| PATENT NO. | : 7,644,948 B2 | Page 1 of 1 |
| APPLICATION NO. | : 11/641499 | |
| DATED | : January 12, 2010 | |
| INVENTOR(S) | : Dominik Schuetz | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 201 days.

Signed and Sealed this

Sixteenth Day of November, 2010

David J. Kappos
*Director of the United States Patent and Trademark Office*